May 15, 1951  W. A. BEDFORD, JR  2,552,764
THREE SIDE LOCK SNAP FASTENER
Filed Dec. 30, 1948
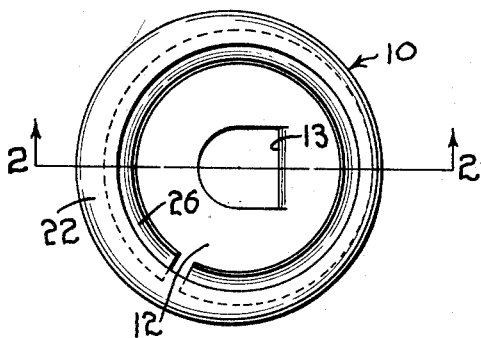
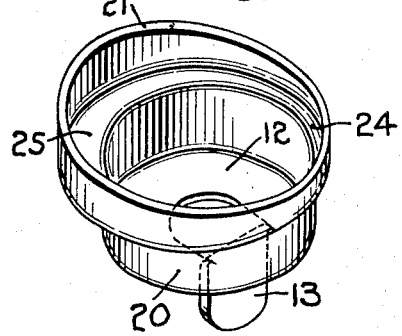
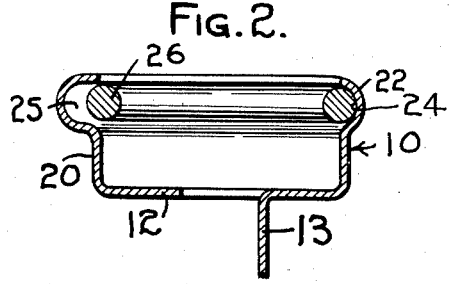
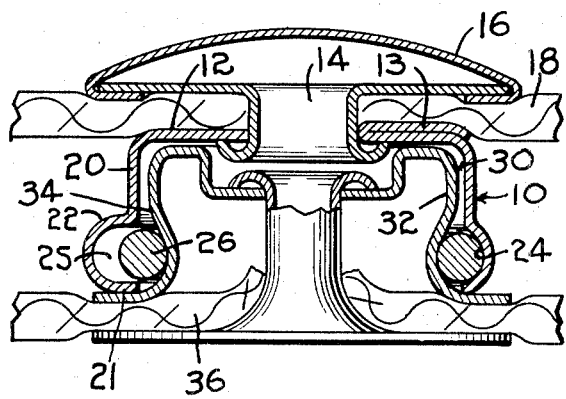
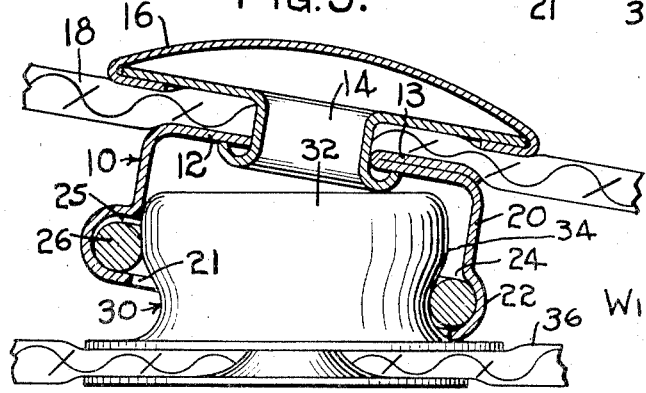
INVENTOR:
WILLIAM A. BEDFORD JR.
BY John Todd
ATTORNEY.

Patented May 15, 1951

2,552,764

UNITED STATES PATENT OFFICE 2,552,764

THREE SIDE LOCK SNAP FASTENER

William A. Bedford, Jr., North Scituate, Mass., assignor to United-Carr Fastener Corporation, Cambridge, Mass., a corporation of Massachusetts Application December 30, 1948, Serial No. 68,154

4 Claims. (Cl. 24—213)

This invention relates generally to snap fasteners and has particular reference to an improved three-side lock snap fastener which may be readily applied to a supporting sheet by an automatic attaching machine.

The principal object of this invention is to provide an improved snap fastener assembly in which the socket and cooperating stud member can be disengaged only by a separating force applied on one predetermined side of the assembly.

A further object of the invention is to provide a three-side lock snap fastener socket having a stud-engaging spring disposed in an eccentric recess in the body of the socket whereby the spring is capable of lateral movement and expansion into one portion of the recess when the stud is removed from the socket.

A still further object of the invention is to provide a three-side lock snap fastener socket member having a tab extending from the body of the socket, for cooperating with positioning means of an automatic attaching machine to align the socket into a predetermined direction.

Other objects of the invention, will, in part, be obvious, and will, in part, appear hereinafter.

For a fuller understanding of the nature and objects of the invention, reference should be had to the following detailed description, taken in conjunction with the accompanying drawing, in which:

Fig. 1 is a plan view of the socket member embodying the features of the invention;

Fig. 2 is a view in section taken on line 2—2 of Fig. 1;

Fig. 3 is a view in perspective of the socket member during one stage of the manufacturing process;

Fig. 4 is a view in elevation, partly in section, of the socket member of the invention and an assembled stud member; and Fig. 5 is a view in elevation, partly in section, of the socket and a cooperating stud member showing the effect of a disengaging force applied on the unlocking side of the socket.

Referring to the drawing, there is illustrated a three-side lock snap fastener assembly, comprising a socket member 10 and a cooperating stud member 30. The socket member 10 is preferably formed of sheet metal, and comprises a base member 12, having an opening therein for receiving a rivet 14, for attaching the socket to an attaching cap 16 and a supporting sheet 18. The opening in the base member 12 is formed by punching out a tab 13, which is left attached to the base member 12 on one side and extending outwardly therefrom for a purpose which will be hereinafter described.

Extending upwardly from the base member 12 is a circular wall 20, and a radially enlarged portion 22 thereon, forming a circumferential recess 24 in the interior of the wall.

The recess 24, in the preferred embodiment, is slightly off center in relation to the wall 20, thereby forming a deeper portion 25 on one side of the socket. The method of forming the eccentric recess 24 on the socket is illustrated in Fig. 3, which shows the socket at one stage in the manufacturing process. The socket wall 20 has been formed by drawing a flat sheet of suitable shape to provide a higher wall portion 21 on one side of the socket than on the opposite side. The wall 20 is subsequently curled inwardly by suitable dies to form the recess 24, as shown in the drawings of the completed socket, whereby the higher portion of the wall 20 forms the deeper portion 25 of the recess. A split ring spring member 26 is disposed in the recess to engage and retain the stud member 30 when the stud is inserted into the socket. The spring member 26 is smaller in diameter than the recess, thereby allowing the spring member room for lateral movement and/or expansion in the recess.

The stud member 30 comprises a shank 32 having an enlarged portion thereon to form a shoulder 34, and is adapted to be attached to a supporting sheet 36 in the conventional manner.

When the socket is to be applied to a supporting sheet by an automatic attaching machine, the tab 13 provides means whereby the socket may be aligned in a predetermined direction by the positioning mechanism of the machine, so that the socket may be attached to the supporting sheet with the unlocking side of the socket in a predetermined direction in relation to the sheet. As illustrated in Fig. 3, when the socket is attached to the sheet, the tab 13 penetrates the sheet and is curled under the attaching cap, thereby gripping the sheet and assisting in preventing rotation of the socket.

To assemble the stud and socket, the stud member 30 is snapped into the socket 10 in the conventional manner, and the spring member 26 expands over the shoulder 34, engaging the stud shank 32, thereby retaining the stud in the socket.

The effect of a disengaging force applied to the stud and socket on the side of the socket having the deeper recess is best illustrated in Fig. 5.

A separating force so applied tends to tilt the socket upwardly on the side thereof carrying the deeper recess, pivoting the stud on the spring member 26 on the opposite side, thereby confining the spring member in the recess. By so confining the spring member in the recess, the shoulder 34 of the stud is able to expand the spring member into the deeper portion 25 of the recess, thereby allowing the stud shoulder 34 to pass through the ring and become disengaged from the socket.

A disengaging force applied to the stud and socket at any other point on the periphery of the assembly such as opposite the recess at 24 in Fig. 4 causes the shoulder of the stud to engage the spring member and force it against the bottom of the recess. Since the recess at this point is not deep enough to completely receive the spring member, the spring member extends slightly beyond the recess, and prevents the stud shoulder from becoming disengaged from the spring member.

For proper operation of the device, the depth of the recess must be in proper relation to the cross-sectional diameter of the spring and the clearance between the enlarged portion of the stud and the socket wall. The portion of the spring adjacent the deeper portion of the recess must be able to pass almost completely into the recess, but must be able to pass only part way into the recess on the locking sides. Hence, the spring should have a cross-sectional diameter greater than the depth of the recess on the locking sides.

Since certain obvious changes may be made without departing from the scope of the invention, it is intended that all matter contained herein should be interpreted in an illustrative rather than in a limiting sense.

I claim:

1. A socket member for use with a stud of the type which has a shank having an enlarged head and a contracted neck, the socket comprising a base having an opening therein to receive an attaching rivet, a tab extending outwardly from the base, a circular wall on the base forming a stud-receiving cavity, a radially enlarged portion in the wall forming a circumferential recess therein of substantially uniform width, the recess being in eccentric relation to the wall thereby forming a deeper recess on one side of the socket, a split ring spring member of a thickness substantially equal to the width of the recess and disposed in the recess to expand laterally over the enlarged head of the stud and engage the contracted neck when the stud is inserted into the socket, the spring member being capable of expansion laterally into the deeper portion of the recess when a disengaging force is applied to the stud and socket members on the side having the deeper portion of the recess.

2. A three-side lock snap fastener comprising a socket member adapted for use with a stud having an enlarged portion thereon, said socket member comprising a hollow body having an attaching end and a stud-receiving end, said stud-receiving end having an opening therein to receive the stud, means associated with said socket for cooperation with said stud to prevent separation of the stud and socket in response to a separating force applied on any one of three sides thereof while permitting separation in response to a separating force applied on the fourth side, a tab formed from the material of said socket at the attaching end thereof and providing a rivet-receiving opening therein, said tab extending outwardly from said attaching end adjacent said opening and adapted to be bent back by an attaching rivet during attachment of the socket to a supporting material.

3. A socket member for use with a stud having an enlarged head portion thereon, the socket member comprising a hollow walled body having an opening in the end thereof to receive the stud and a circumferential recess in the walls thereof adjacent the stud-receiving opening, a split ring spring member disposed in the recess, said recess having a substantially uniform width and being in eccentric relation to the walls of said body thereby providing a deeper recess in one portion of the walls than in an opposite portion, said spring member being expansible into the deeper portion of the recess to permit separation of the stud and socket when a separating force is applied thereto on the side having the deeper recess.

4. A socket member for use with a stud of the type having an enlarged head and a contracted neck, the socket member comprising a hollow body formed of sheet metal walls, the body having an opening in the end thereof to receive the stud, a radially enlarged portion in the walls forming a circumferential recess adjacent the stud-receiving opening, a split ring spring member in the recess disposed to expand over the enlarged head of the stud and engage the contracted neck when the stud is inserted into the opening, the recess having a uniform width substantially equal to the thickness of the spring member and being in eccentric relation to the walls thereby providing a deeper recess in one portion of the walls than in an opposite portion, said spring member being expansible into the deeper portion of the recess to permit separation of the stud and socket when a disengaging force is applied thereto on the side having the deeper recess.

WILLIAM A. BEDFORD, Jr.

REFERENCES CITED

The following references are of record in the file of this patent:

UNITED STATES PATENTS

| Number | Name | Date |
|---|---|---|
| 2,328,016 | Huelster | Aug. 31, 1943 |
| 2,441,573 | Huelster | May 18, 1948 |